United States Patent [19]
Thieret

[11] Patent Number: 5,867,142
[45] Date of Patent: Feb. 2, 1999

[54] SYSTEM AND METHOD FOR PROCESSING AN IMAGE HAVING EDGES

[75] Inventor: Tracy E. Thieret, Webster, N.Y.

[73] Assignee: Xerox Corporation, Stamford, Conn.

[21] Appl. No.: 796,971

[22] Filed: Nov. 25, 1991

[51] Int. Cl.[6] .................................................. G09G 5/36
[52] U.S. Cl. .......................... 345/136; 358/447; 382/269
[58] Field of Search .............................. 340/730, 825.34, 340/728, 735; 358/455–462, 477, 488, 448, 474, 447; 382/270, 269, 298, 459, 266, 199, 205

[56] References Cited

U.S. PATENT DOCUMENTS

| 4,259,694 | 3/1981 | Liao . | |
| 4,698,778 | 10/1987 | Ito et al. . | |
| 4,703,363 | 10/1987 | Kitamura . | |
| 4,805,033 | 2/1989 | Nishikawa . | |
| 4,817,174 | 3/1989 | Nakatani . | |
| 4,866,534 | 9/1989 | Tada . | |
| 5,036,405 | 7/1991 | Kojima | 358/448 |
| 5,126,726 | 6/1992 | Howard et al. | 340/728 |

OTHER PUBLICATIONS

"Anti-Aliasing Video Lookup Table" IBM Technical Disclosure Bulletin, vol. 27 No. 10B, Mar. 1985.

Primary Examiner—Amare Mengistu
Attorney, Agent, or Firm—Finnegan, Henderson, Farabow, Garrett & Dunner

[57] ABSTRACT

A method of processing an image to reduce false granularity, or "aliasing", resulting from the reproduction of edges using fixed size pixels. In the preferred embodiment of the invention, certain pixels adjacent to black pixels corresponding to an edge are set to a gray level. The setting of certain pixels to a gray level involves detecting a pattern in a block of pixels by detecting subpatterns within the block of pixels.

14 Claims, 14 Drawing Sheets

|              | 0 | 1 | 2 | 3 | 4 | 5 | 6 | 7 | 8 | 9 | A | B | C | D | E | F |
|--------------|---|---|---|---|---|---|---|---|---|---|---|---|---|---|---|---|
| MASK1(ON):   | 0 | 0 | 1 | 0 | 0 | 0 | 0 | 0 | 0 | 0 | 0 | 0 | 0 | 0 | 0 | 0 |
| MASK2(ON):   | 0 | 0 | 0 | 0 | 0 | 0 | 0 | 0 | 0 | 1 | 0 | 0 | 0 | 0 | 0 | 0 |
| MASK3(OFF):  | 0 | 0 | 0 | 0 | 0 | 0 | 0 | 0 | 0 | 0 | 0 | 1 | 1 | 1 | 1 | 0 |

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| MASK1(ON): | 0 | 0 | 1 | 0 | 0 | 0 | 0 | 0 | 0 | 0 | 0 | 0 | 0 | 0 | 0 | 0 |
| MASK2(ON): | 0 | 0 | 0 | 0 | 0 | 0 | 0 | 0 | 0 | 1 | 0 | 0 | 0 | 0 | 0 | 0 |
| MASK3(OFF): | 0 | 0 | 0 | 0 | 0 | 0 | 0 | 0 | 0 | 0 | 0 | 1 | 1 | 1 | 1 | 0 |

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| MASK1(ON): | 0 | 1 | 1 | 0 | 0 | 0 | 0 | 0 | 0 | 0 | 0 | 0 | 0 | 0 | 0 | 0 |
| MASK2(ON): | 0 | 0 | 0 | 0 | 0 | 0 | 1 | 1 | 0 | 0 | 0 | 0 | 0 | 0 | 0 | 0 |
| MASK3(OFF): | 0 | 0 | 0 | 0 | 0 | 0 | 0 | 0 | 0 | 0 | 1 | 1 | 1 | 1 | 1 | 0 |

|            | 0 | 1 | 2 | 3 | 4 | 5 | 6 | 7 | 8 | 9 | A | B | C | D | E | F |
|------------|---|---|---|---|---|---|---|---|---|---|---|---|---|---|---|---|
| MASK1(ON): | 0 | 1 | 1 | 0 | 0 | 0 | 0 | 0 | 0 | 0 | 0 | 0 | 0 | 0 | 0 | 0 |
| MASK2(ON): | 0 | 0 | 0 | 0 | 0 | 0 | 1 | 1 | 0 | 0 | 0 | 0 | 0 | 0 | 0 | 0 |
| MASK3(OFF):| 0 | 0 | 0 | 0 | 0 | 0 | 0 | 0 | 0 | 0 | 1 | 1 | 1 | 1 | 1 | 0 |

SYSTEM AND METHOD FOR PROCESSING AN IMAGE HAVING EDGES

BACKGROUND OF THE INVENTION

1. Field of the Invention

The present invention relates to a system and method for processing an image having edges, and more particularly to a system and method for reducing false granularity in rendering edges in an image.

2. Description of Related Art

An image reproduction machine, such as a printer, typically partitions an image into picture elements called pixels. Each pixel has a fixed shape and size, the area within a particular pixel has uniform intensity. In general, however, image structures do not have shapes corresponding to the pixel shape. Ideally, the pixel size should be sufficiently small so that image quality is good, and a viewer of an image produced by a printer does not perceive the individual pixels. Because the available pixel size is typically fixed, there is a need for improvement in image quality achieved for a given pixel size.

U.S. Pat. No. 4,703,363 issued to Kitamura relates to an apparatus for improving image quality by smoothing jagged border lines. Other publications that may be of general interest include U.S. Pat. No. 4,866,534 issued to Tada, U.S. Pat. No. 4,817,174 issued to Nakatani, U.S. Pat. No. 4,805,033 issued to Nishikawa, U.S. Pat. No. 4,259,694 issued to Liao, and U.S. Pat. No. 4,698,778 issued to Ito et al.

SUMMARY OF THE INVENTION

It is an object of the present invention to process an image so that false granularity tends to be less perceptible to the viewer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve these objects and other advantages of the present invention, a method of processing an input image having a plurality of pixels to generate an output image having a plurality of pixels, comprises the steps performed for each input image pixel, of forming a first value from intensities of a first set of input image pixels around the input pixel; determining whether the first value is a member of a first set of values; a first step of setting an output image pixel intensity, corresponding to the input pixel, in accordance with an intensity of the input pixel, if the first value is not a member of the first set of values; otherwise, a second step of forming a second value from intensities of a second set of input image pixels around the input pixel; and a second step of setting an output image pixel intensity, corresponding to the input image pixel, in accordance with the second value.

According to another aspect of the present invention, a system for processing an input image having a plurality of pixels to generate an output image having a plurality of pixels, comprises first means for forming a first value from intensities of a first set of input image pixels around the input pixel; means for determining whether the first value is a member of a first set of values; first means for setting an output image pixel intensity, corresponding to the input pixel, in accordance with an intensity of the input pixel, if the first value is not a member of the first set of values; second means for forming a second value from intensities of a second set of input image pixels around the input pixel; and second means for setting an output image pixel intensity, corresponding to the input image pixel, in accordance with the second value.

It is to be understood that both the foregoing general description and the following detailed description are exemplary and explanatory only and are not restrictive of the invention, as claimed.

The accompanying drawings which are incorporated in and which constitute a part of this specification, illustrate one embodiment of the invention and, together with the description, explain the principles of the invention, and additional advantages thereof.

BRIEF DESCRIPTION OF THE DRAWINGS

FIGS. 8(a)–8(c) are diagrams showing a correspondence between a pattern of pixels and masks used to detect the pattern;

FIGS. 9(a)–9(c) are diagrams showing a correspondence between another pattern and masks used to detect the other pattern;

FIGS. 10(a)–10(c) are diagrams showing a correspondence between another pattern and masks used to detect the other pattern;

FIGS. 11(a)–11(c) are diagrams showing a correspondence between another pattern and masks used to detect the other pattern;

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
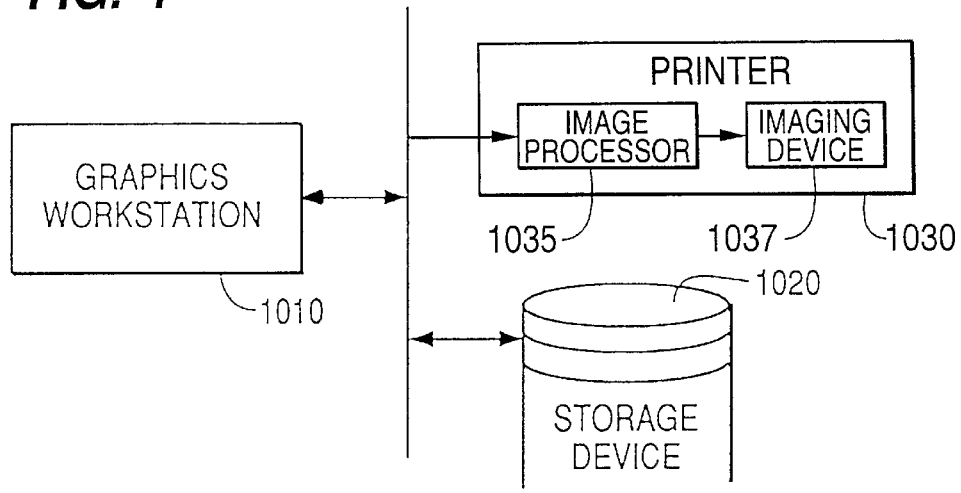
FIG. 1 is a diagram illustrating a printing system according to a preferred embodiment of the invention.

FIG. 1 shows a data flow between devices in a system according to a preferred embodiment of the invention. Graphics workstation 1010 includes a keyboard and video screen that allow a user to run programs to generate image data. Image data can be stored on storage device 1020. Graphics workstation 1010 allows a user to cause an image stored on storage device 1020 to be printed on a printer 1030.

Printer 1030 is an iongraphic printer. Printer 1030 includes an image processor 1035 that receives image data sent over network 1015. A feature of iongraphic printing is that ions are deposited onto a sheet of paper in an image configuration. The level of gray for a given pixel area determined by the quantity of ions that are deposited onto the pixel area.

Figure 2:
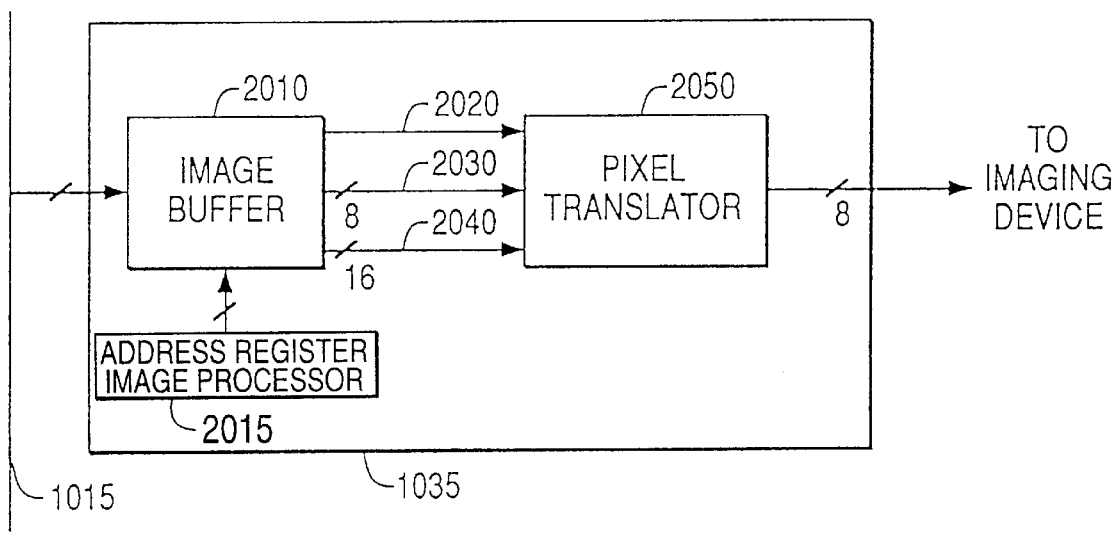
FIG. 2 is a block diagram showing parts of FIG. 1 in more detail.

FIG. 2 is a block diagram of image processor 1035. Among the figures, corresponding elements are labeled with corresponding reference numbers. Image processing section 1035 processes the image by translating one input pixel at a time. Image data from network 1015 is applied to image buffer 2010. The input pixel is translated to an output pixel based on the value of the input pixel and on values of pixels surrounding the input pixel. Read address register 2015 applies an address to image buffer 2010 to determine which input pixel in the image is currently being translated.

Figures 3, 13:
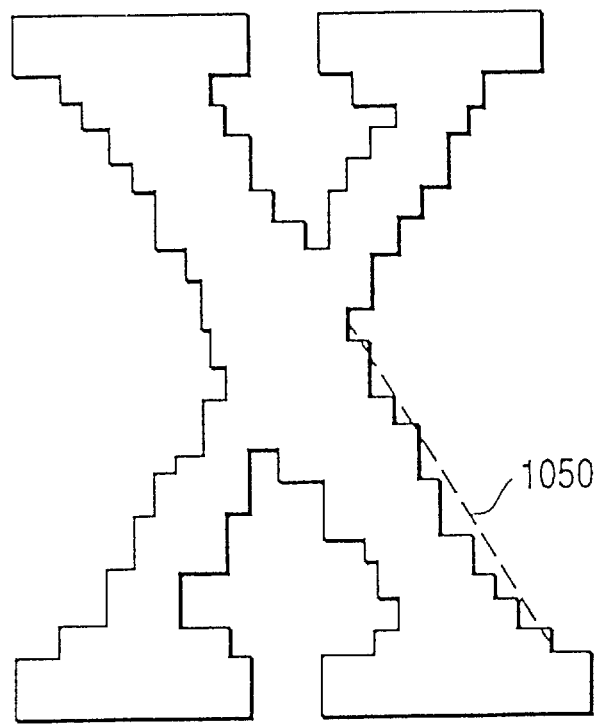
FIG. 3 is a diagram for explaining the translation of a single input pixel.
FIG. 13 is a highly magnified diagram showing results achieved by presently available technology.

FIG. 3 shows a 5×5 group of pixels relevant to the translation of a single input pixel. In FIG. 3 "X" denotes an input pixel, the pixel currently being translated. Image buffer 2010 sends a 1-bit value of the input pixel to pixel translator 2050 via line 2020. "I" denotes a group of 8 inner local pixels immediately surrounding the input pixel. Image buffer 2010 sends an 8-bit value corresponding to the 8 inner local pixels to pixel translator 2050 via bus 2030. "O" denotes pixels belonging to a group of 16 outer local pixels surrounding the inner local pixels. Image buffer 2010 sends a 16-bit value corresponding to 16 outer local pixels to pixel translator 2050 via bus 2040.

Figure 4:
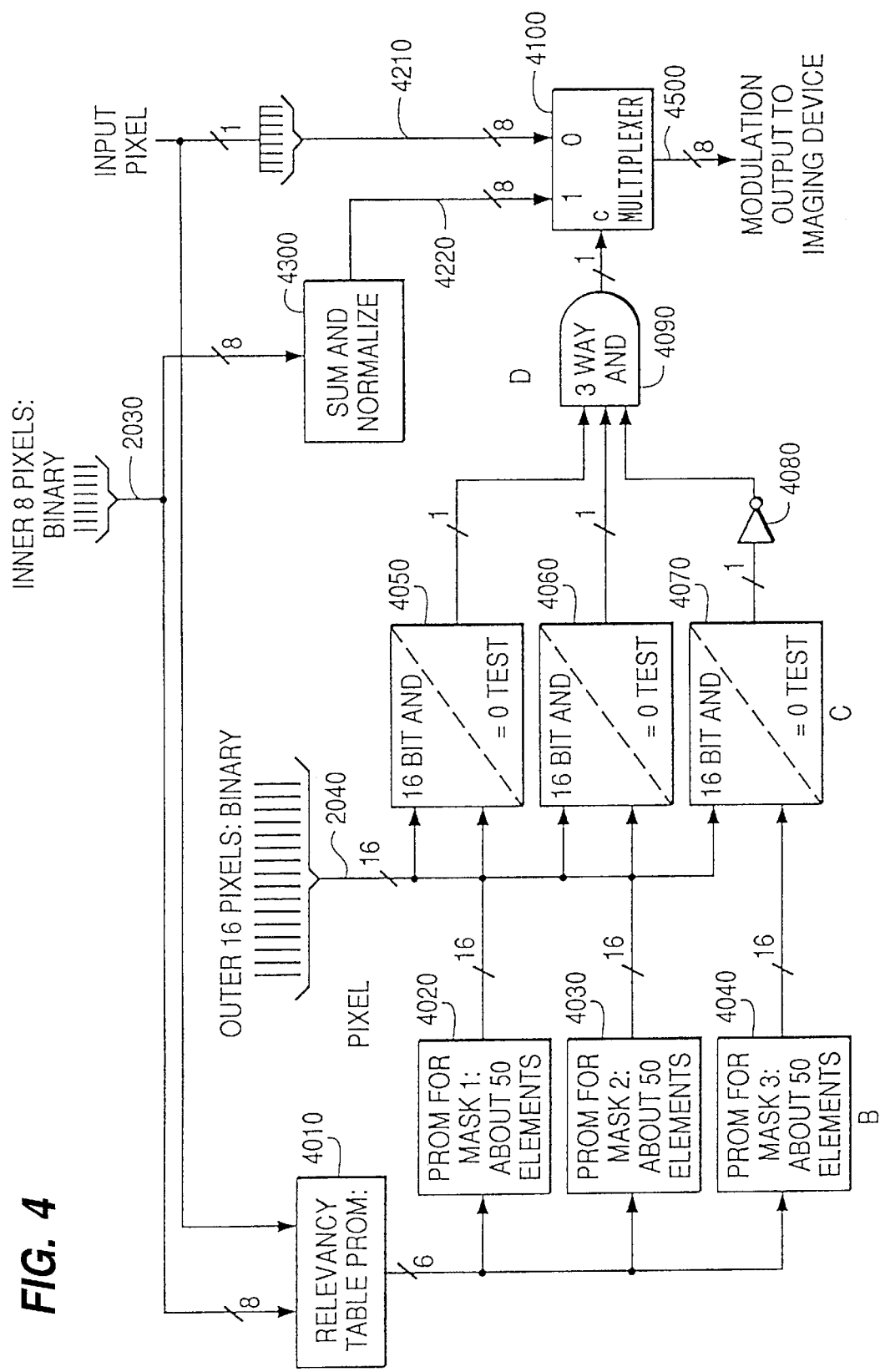
FIG. 4 is a block diagram showing parts of FIG. 2 in more detail.

FIG. 4 shows pixel translator 2050 in more detail. Bus 2020 sends the value of the inner local pixels to relevancy table 4010. The output of relevancy table 4010 is used to address mask PROM 4020, mask PROM 4030, and mask PROM 4040. A 16-bit output of mask PROM 4020 is ANDed bitwise with data of the 16 outer local pixels by logic block 4050. Similarly, a 16-bit output of mask PROM 4030 is ANDed bitwise with data of the 16 outer local pixels by logic block 4060, and a 16-bit output of mask PROM 4040 is ANDed bitwise with data of 16 local outer pixels by logic block 4070.

Each of logic blocks 4050–4070 compares the results of their respective ANDs to zero and generates a signal if the result of the AND is equal to zero. The signals generated by logic blocks 4050 and 4060 are processed by gate 4090 and the signal generated by logic block 4070 is processed by gates 4080 and 4090, and the resulting signal is sent to a control input of 8-bit multiplexer 4100.

When multiplexer 4100 receives a zero on the control input, multiplexer 4100 steers an 8-bit signal on a first input, labeled "0", to an 8-bit output of multiplexer 4100. When multiplexer 4100 receives a 1 on the control input, multiplexer 4100 steers an 8-bit signal on a second input, labelled "1", to the output of multiplexer 4100.

The 8-bits of bus 4210 are each connected to the 1-bit input pixel. In other words, the 1-bit input pixel is translated to an 8-bit gray level of either 8 bits of 0 or 8 bits of 1.

Sum and normalize circuitry 4300 generates a gray level based on values of the 8 local inner pixels on bus 2030. Sum and normalize circuitry 4300 sums the binary values of the 8 inner pixels, and then translates the sum to a gray level. The sum may be translated to a gray by indexing into a table of gray levels using the sum.

Although, in the preferred embodiment, the bit width of the input to sum normalized circuitry 4300 is the same as the bit width of the output of sum and normalize circuitry 4300, the fact that the input and output bit widths are the same is merely a coincidence. For example, if the output device had only 16 gray levels, instead of the 256 levels of the printer of the preferred embodiment, the output of sum and normalize circuitry 4300 would then be only 4-bits wide.

The anti-aliasing processing of image processor 1035 may be conceptualized as detecting an edge in a 5×5 group of pixels by detecting two patterns within the 5×5 group of pixels. The pixels labeled "I" in FIG. 3 may be conceptualized as an inner pattern, while the pixels labeled "O" may be conceptualized as an outer pattern. The inner pattern is used to index into a table containing either an associated outer pattern or containing data to indicate that the 5×5 group of pixels constitutes an irrelevant pattern.

More specifically, the anti-aliasing processing of image processor 1035 may be conceptualized as detecting an edge in a region of the image represented within the 5×5 group of pixels being processed. This edge has an entry and an exit from the 5×5 region. This edge is relevant if it passes within one pixel of the central pixel location in the 5×5 region. Two tests are performed to determine whether an edge passes through the region. The first test concerns only the inner 3×3 section of the region. Only 512 possible combinations are available for binary filling of this 9 pixel region. The 5×5 region may be filled in any of 33.5 million patterns ($2^{25}$). The initial screening using the 3×3 region greatly reduces the number of comparisons required to determine the relevancy of the 5×5 pattern. Of the 512 patterns possible in the 3×3 area, approximately 50 of patterns are relevant.

The second, outer, pattern is used to detect the entry and exit of the edge from the 5×5 region. The tests for entry and exit are embodied in the 16 bit AND operations performed by blocks labeled 4050 and 4060. Block 4070 excludes patterns that contain additional pixels not associated with the edge being sought, thereby preserving image detail.

Figure 5:
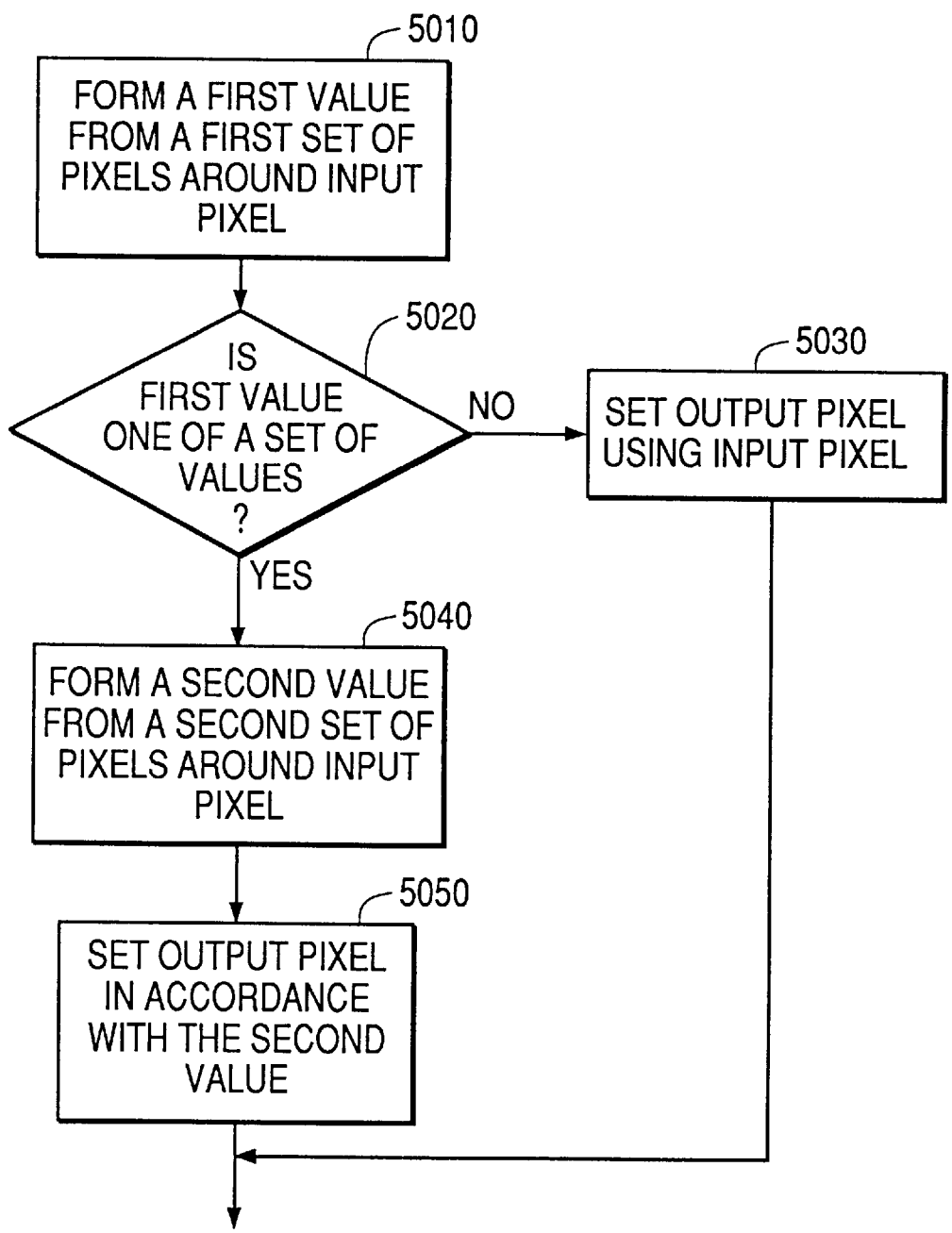
FIG. 5 is a flowchart showing a processing of first preferred embodiment.

FIG. 5 shows the anti-aliasing processing of the image processor 1035. The processing of FIG. 5 is performed for each pixel in an image. A first value is formed from the pixels immediately surrounding the input pixel currently being processed (Step 5010). It is determined whether the first value is one of a set of values. (Step 5020) If the first value is not one of a set of values, the output pixel is set using the value of the input pixel (Step 5030). If the first value is one of the set of values, a second value is formed from a second set of pixels around the input pixel (Step 5040). In the preferred embodiment, the second set of pixels is mutually exclusive from the first set of pixels, and surrounds the first set of pixels. Finally, the output pixel is set in accordance with the second value (Step 5050), and processing proceeds to the next input pixel in the image.

Figure 6:
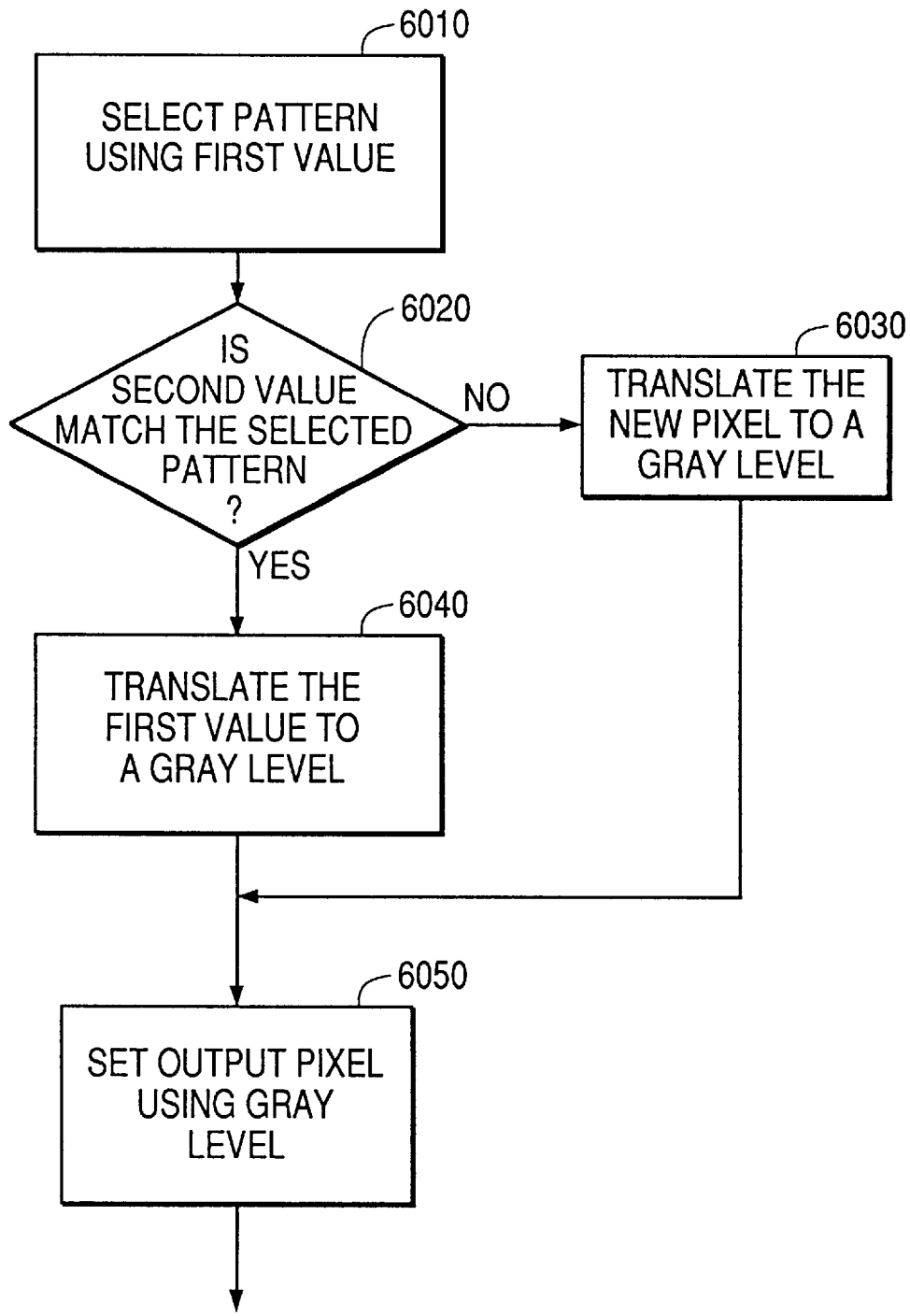
FIG. 6 is a flowchart showing a processing of a step shown in FIG. 5 in more detail.

FIG. 6 is a flowchart of the processing of Step 5050 in FIG. 5 in more detail. First, an outer pattern is selected using the first value (Step 6010). It is determined whether the second value substantially matches the selected outer pattern (Step 6020). If the second value does not substantially match the outer pattern, the input pixel is translated to a gray level (Step 6030), and the output pixel is set using the gray level (Step 6050). If the second value does substantially match the selected outer pattern, then the first value is translated to a gray level (Step 6040) and the output pixel is set using the gray level (Step 6050).

Figure 7:
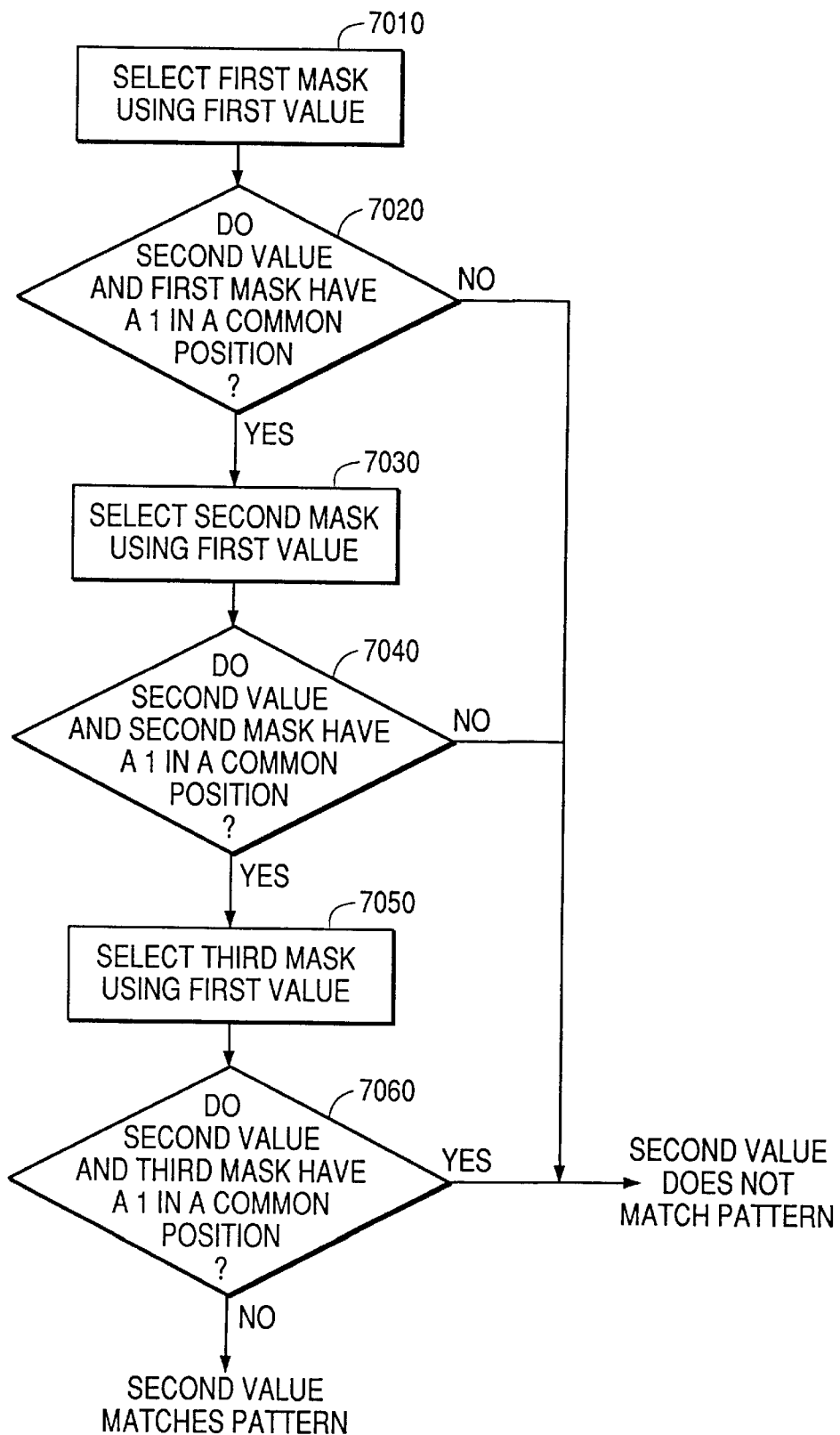
FIG. 7 is a flowchart showing a processing of a step of FIG. 6 in detail.

FIG. 7 is a flowchart showing the processing of Step 6020 in FIG. 6, determining whether the second value substantially matches the outer pattern, in detail. A first mask is selected using the first value (Step 7010). It is determined whether the second value and first mask have a 1 in a common position (Step 7020). The second value does not substantially match the selected outer pattern if the first mask and first value do not have a 1 in a common position. Similar processing is performed for a second mask (Steps 7030 and 7040).

A third mask is selected using the first value (Step 7050). It is determined whether the second value and third mask have a 1 in a common position (Step 7060). The second value does not substantially match the outer pattern, if the third mask and first value have a 1 in a common position, otherwise, the second value matches the selected outer pattern.

The manner in which the preferred embodiment effects the processing described in FIGS. 5–7 will now be described. When register 2015 in FIG. 2 increments and sends a new value to image buffer 2010, image buffer 2010 reads an input pixel from a certain location in a memory and sends the value of the input pixel to pixel translator 2050 via line 2020. Image buffer 2010 also reads 8 memory locations corresponding to inner local pixels surrounding the input pixel and sends the 8 values to pixel translator 2050 via bus 2030 (see Step 5010). Similarly, image buffer 2010 reads locations in the image memory corresponding to the 16 outer local pixels and sends the 16 read values pixel translator 2050 via bus 2040. (see Step 5040)

As can be seen in FIG. 4, the value of the inner local pixels and the value of the input pixel is used to address relevancy table 4010. Certain values of input pixel in combination with the inner local pixels correspond to irrelevant patterns. For example, a pattern that is all 1s or all 0s is irrelevant because such a pattern contains no edges.

Locations in relevancy table 4010 corresponding to irrelevant patterns contain the pattern number of a "null pattern." It is impossible for the 16 outer pixels to substantially match the null pattern, as will be discussed below. When PROMs 4020–4040 are addressed with the pattern number of the null pattern, PROMs 4020–4040 generate values that ensure that AND gate 4090 applies a zero to the control input of multiplexer 4100, thereby causing multiplexer 4100 to steer the signal on bus 4210 to output bus 4500 (see Steps 5020 and 5030). More specifically, at least one of the inputs to AND gate 4090 is false, because the masks corresponding to the null pattern in PROMs 4020 and 4030 are all 0s, while the mask corresponding to the null pattern in PROM 4040 is all 1's.

If the value of the input pixel in combination with the local inner eight pixels does not correspond to an irrelevant pattern, relevancy table 4010 will address each of PROMs 4020–4040 with a pattern number other than the null pattern number. (see Step 6010) The value generated by PROM 4020 is ANDed with the value of the outer local pixels, and the result of the AND tested for 0, by logic block 4050 (see Steps 7010 and 7020). Similarly, the value generated by PROM 4030 is ANDed to the value of outer local pixels and tested for 0 by logic block 4060. (Steps 7030 and 7040)

The output from PROM 4040 is ANDed with the value of the outer local pixels by logic block 4070, and the output of logic block 4070 is inverted by inverter 4080 (see Steps 7050 and 7060).

In other words, if the value of the local eight inner pixels is considered a first value, the preferred method determines if the first value is one of a first set of values. The output pixel is set by reading a location in a first table using the first value; determining that the first value is a member of a first set of values, if the location contains a pattern number other than that of the null pattern. The preferred method further includes reading a plurality of locations in a second table using the first value, to produce a plurality of masks; and setting the output image pixel intensity, in accordance with the second value and the plurality of masks.

The plurality of masks include first, second, and third masks each having a digit corresponding to each pixel in the second set of pixels, respectively, and the second setting step includes the substeps of comparing the second value to the first mask; comparing the second value to the second mask; comparing the second value to the third mask; reading a location in a third table using the first value to produce a value for the output image pixel, depending upon the results of the comparing steps.

FIGS. 8(*a*)–8(*c*) show the correspondence between a certain pattern and values for each of the first, second and third masks. FIG. 8(*a*) shows a certain pattern for the 16 outer local pixels around the input pixel denoted by "X". In general, there are two groups of pixels, each group containing one or more contiguous pixels, for which at least one pixel in the group should be on. Pixels that should be on in FIG. 8(*a*) are denoted by "Y".

There is one group of pixels for which each pixel in the group should be off. Pixels that should be off are denoted by "N". Pixels that can be either on or off, "don't care" pixels, are denoted by "?".

FIG. 8(*b*) maps the correspondence between digits in each of the three masks and an outer pattern. FIG. 8(*c*) shows the binary representation of three masks corresponding to FIG. 8(*a*). Masks 1 and 2 correspond to the two "Y"s in FIG. 8(*a*), respectively. Mask 3 corresponds to the group of "N"s in FIG. 8(*a*).

FIGS. 9(*a*)–9(*c*), 10(*a*)–10(*c*) and 11(*a*)–11(*c*) are other examples of a correspondence between patterns and masks.

Figure 12:
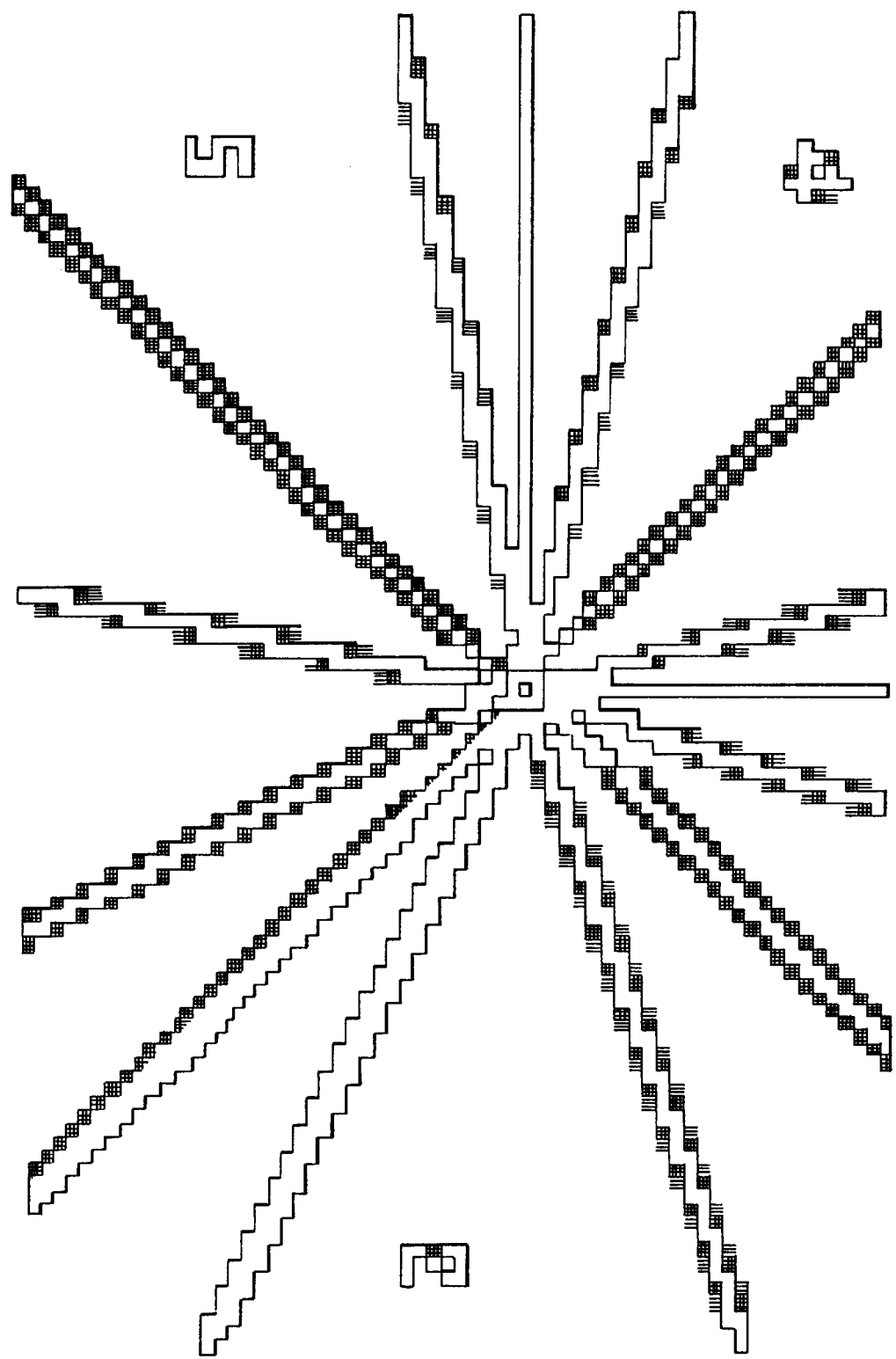
FIG. 12 is a highly magnified diagram showing results achieved by the preferred embodiment of the present invention.

FIG. 12 shows the results of the processing of the preferred embodiment on a spider pattern. Black pixels indicate the original unprocessed pattern.

FIG. 13 illustrates a method of reproducing an edge using presently available technology. Dotted line 1050 is an actual edge. As can be seen in FIG. 13, dotted line 1050 dictates which pixels in the image are turned on. With this prior art method of rendering edges, the false granularity, or "aliasing", created by reproducing the image with pixels will be perceptible to the viewer if the pixel size is not sufficiently small.

Figure 14:
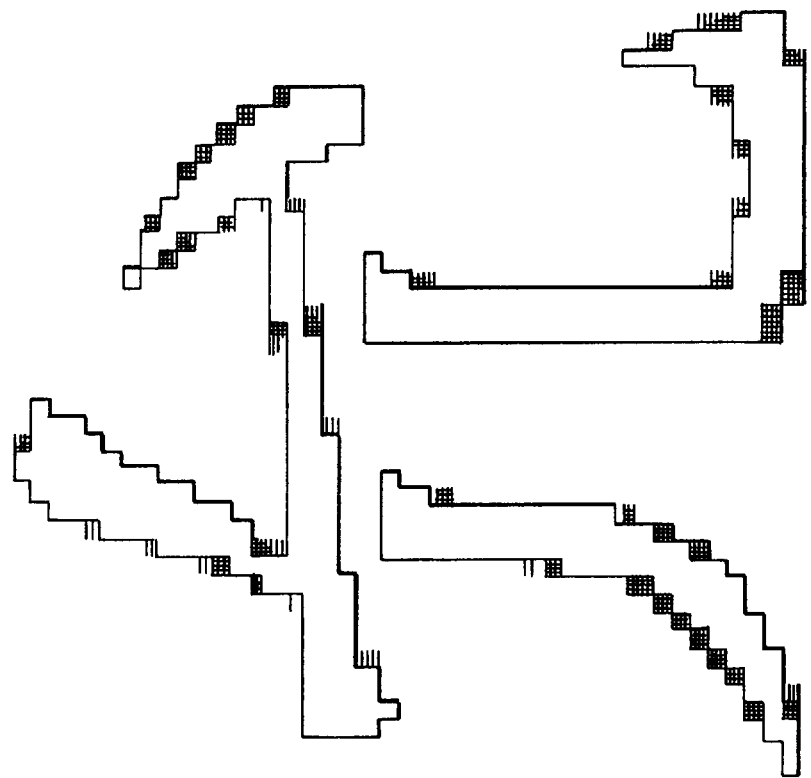
FIG. 14 is a highly magnified diagram of the results of the processing of the preferred embodiment on two Kanji characters.
Figure 14:
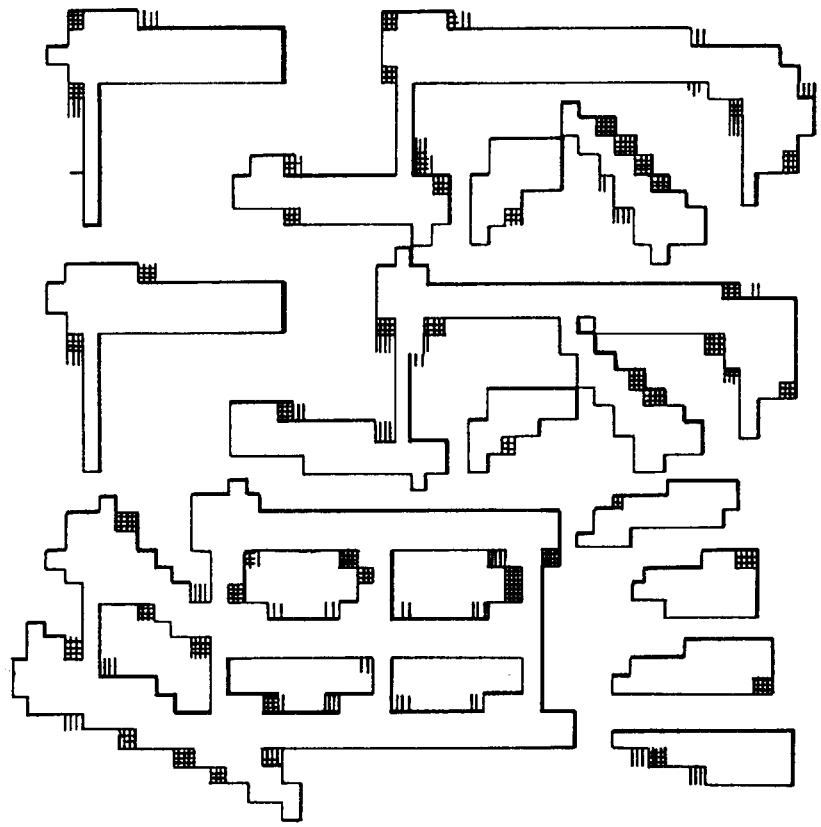
Figure 15:
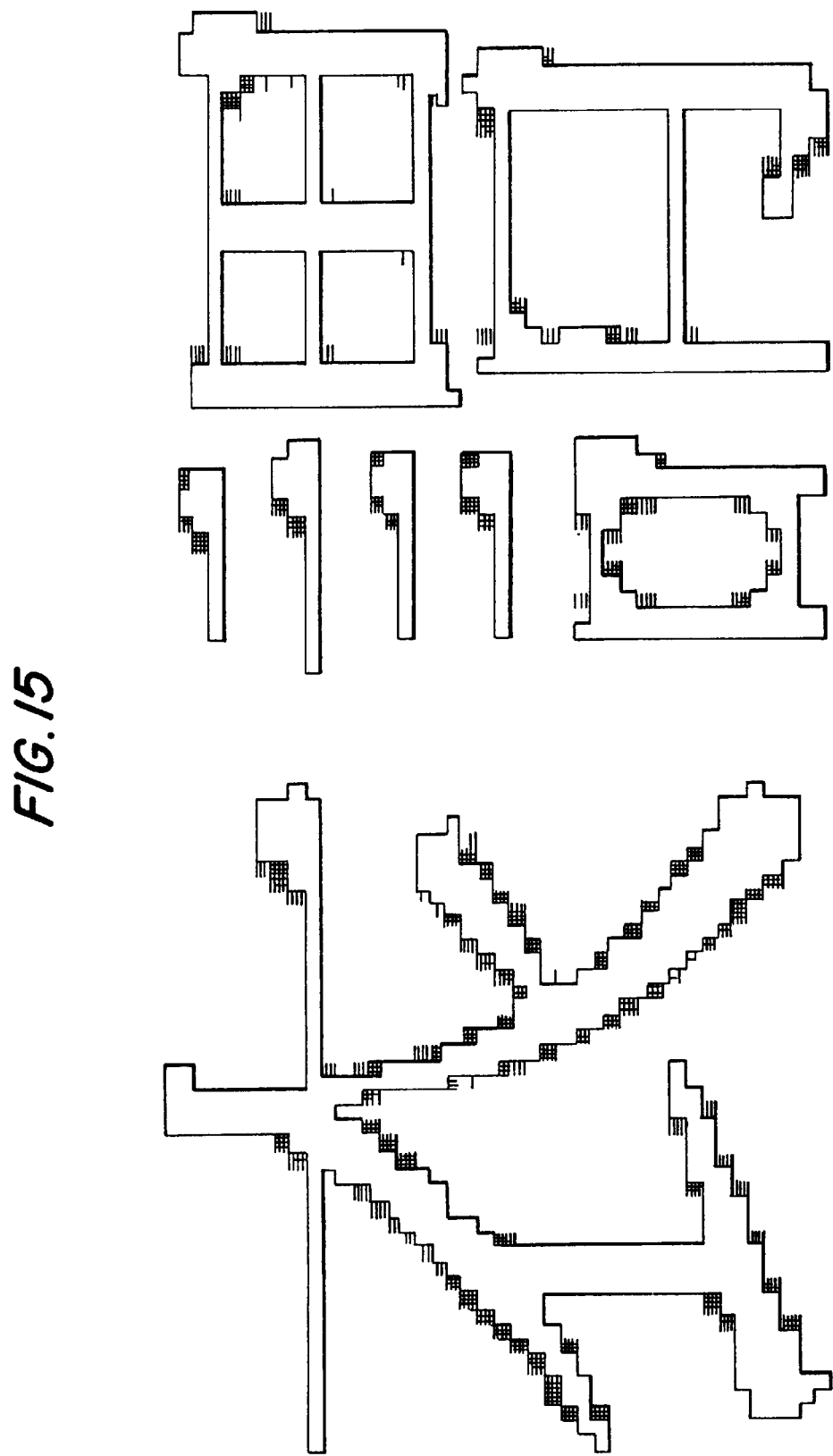
FIG. 15 is another highly magnified diagram showing the results of the processing of the preferred embodiment on two other Kanji characters.

FIGS. 14–15 show results of processing of the preferred embodiment on Kanji characters. The processing of the preferred embodiment should be tailored to preserve distinctions between strokes when processing complex characters.

Figure 16:
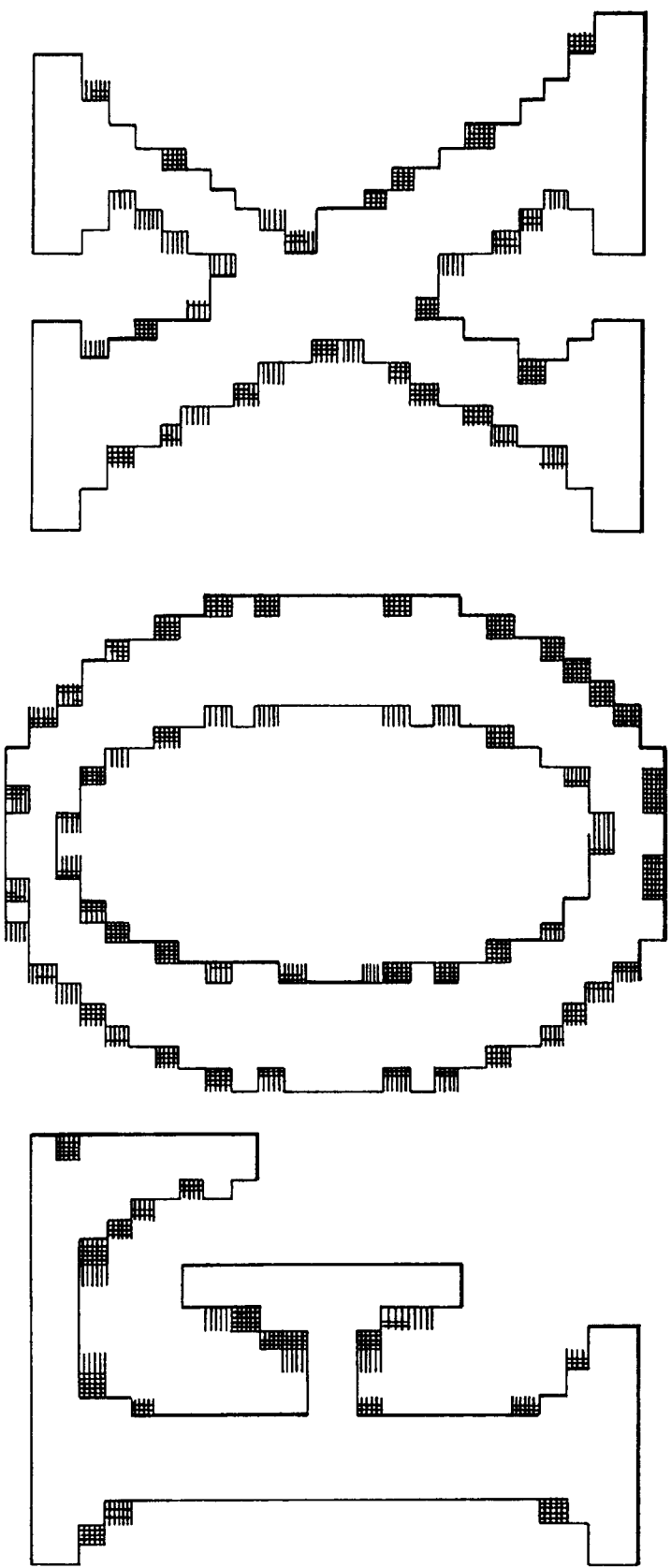
FIG. 16 is a highly magnified diagram of the results of the processing of the preferred embodiment on characters subjected to half-bitting.

FIG. 16 is the result of processing an image that has been subjected to half-bitting, which is a technique for simulating horizontal half pixel widths by turning on every other pixel in the vertical direction. This processing of the preferred embodiment addresses the problem of the alternating pixels being resolved and giving rise to ragged edges.

FIGS. 12 and 14–16 were derived from a software simulation of the hardware discussed above.

In general, the processing of the preferred embodiment should be tailored to the particular type of imaging technology being employed. Values of the relevancy tables can be chosen so that the algorithm both increases widths of printed lines and decreases widths of printed lines in order to maintain a constant line width. Alternatively, if the printer being employed tends to make narrow lines, the masks and relevancy tables can be chosen to always increase line widths.

There is a trade off between detail and smoothness. In the spider diagram of FIG. 12, a trade off of smoothness for detail is evident near the center where the lines converge. Near the center, there are no gray pixels near the edges of lines because prom 4040 is prohibiting the addition of gray pixels when other edges get close to the line being processed. This particular trade off might not be appropriate for a technology having a greater ability to render white and gray pixels near black pixels.

Thus, the preferred embodiment of the present invention determines whether a 5×5 pattern, corresponding to an edge, is irrelevant to anti-aliasing processing. The preferred embodiment capitalizes on the fact that relevant patterns are a small subset of number of possible patterns in a 5×5 group of pixels.

The patterns used in the preferred embodiment have four fold rotational symmetry because, in the case of a square pixel group, an edge may pass through the 3×3 region in any one of four ways corresponding to North-South, East-West, NorthEast-SouthWest, and NorthWest-SouthEast. The mask for any three of these orientations may be derived from the remaining orientation by bit shifts. In other words, the set of relevant patterns may be conceptualized as being partitioned into classes, with each class having four members. One way to optimize is by byte labelling. Two bit rotates of a byte of data cycle through the four, symmetrically related, members of each class. The pattern matching of the preferred embodiment can be implemented without taking advantage of this symmetry.

CONCLUSION

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicants' general inventive concept. For example, although a 256 level system has been described, other levels (i.e., three levels, five levels, six levels, etc.) may be contemplated.

Further, the printer need not be an iongraphic printer and may be some other device for reproducing gray levels. One possibility is a developable latent image reproduction system in which gray levels are determined by the intensity of a laser.

Although a square pixel group has been illustrated, the pixel group may be any shape appropriate for the printing technology. Rectangular, hexagonal, and square are other possible shapes for the region used to determine the presence of pixels near an image edge.

Thus, it will be further apparent to those skilled in the art that various modifications and variations can be made to the instant invention without departing from the scope or spirit of the invention, and it is intended that the present invention cover the modifications and variations provided they come within the scope of the appended claims and their equivalents.

What is claimed is:

1. A method of processing an input image having a plurality of input pixels to generate an output image having a plurality of output pixels, comprising the steps performed for each input pixel, of:

a first forming step of forming a first value from intensities of a first set of pixels around the input pixel;

determining whether the first value is a member of a first set of values;

a first setting step of setting an output pixel intensity, corresponding to the input pixel, in accordance with an intensity of the input pixel, if the first value is not a member of the first set of values;

otherwise, a second forming step of forming a second value from intensities of a second set of pixels around the input pixel, the second set of pixels including a pixel that is not included in the first set of pixels;

a second setting step of setting an output pixel intensity, corresponding to the input pixel, in accordance with the second value.

2. The method of claim 1, wherein the determining step includes the substeps of:

reading a location in a first memory means using the first value;

determining that the first value is a member of a first set of values, if the location contains a certain value, and wherein the second setting step includes the substeps of selecting a pattern, using the first value; and determining whether the second value substantially matches the pattern;

setting the output pixel, in accordance with whether the second value substantially matches the pattern.

3. The method of claim 1, wherein the determining step includes the substeps of:

reading a location in a first memory means using the first value;

determining that the first value is a member of a first set of values, if the location contains a certain value, and wherein the second setting step includes the substeps of reading a plurality of locations in a second memory means using the first value, to produce a plurality of masks; and setting the output pixel, in accordance with the second value and the plurality of masks.

4. The method of claim 3, wherein the plurality of masks include first, second, and third masks each having a digit corresponding to each pixel in the second set of pixels, respectively, and the second setting step includes the substeps of comparing the second value to the first mask;

comparing the second value to the second mask;

comparing the second value to the third mask; and reading a location in a third memory means using the first value to produce an intensity value for the output pixel, depending on the results of the comparing steps.

5. The method of claim 3, wherein the plurality of masks include first, second, and third masks each having a digit corresponding to each pixel in the second set of pixels, respectively, and the second setting step includes the substeps of a first step of ANDing the second value with the first mask;

a second step of ANDing the second value with the second mask;

a third step of ANDing the second value to the third mask;

reading a location in a third memory means using the first value to produce an intensity value for the output pixel, if the results of the first and second ANDing steps is nonzero and the result of the third ANDing step if zero.

6. The method of claim 1, wherein the second forming step includes the substep of forming the second value from intensities of a second set of pixels that are mutually exclusive from the first set of pixels.

7. The method of claim 1, wherein the second forming step includes the substep of forming the second value from intensities of a second set of pixels that are surrounding the first set of pixels.

8. A system for processing an input image having a plurality of input pixels to generate an output image having a plurality of output pixels, comprising:

a first forming step of forming a first value from intensities of a first set of pixels around the input pixel;

means for determining whether the first value is a member of a first set of values;

first setting means for setting a output pixel intensity, corresponding to the input pixel, in accordance with an intensity of the input pixel, if the first value is not a member of the first set of values;

second forming means for forming a second value from intensities of a second set of pixels around the input pixel, the second set of pixels including a pixel that is not included in the first set of pixels; and second setting means for setting an output pixel intensity, corresponding to the input pixel, in accordance with the second value.

9. The system of claim 8, wherein the determining means includes a first memory means;

means for reading a location in the first memory means using the first value;

means for determining that the first value is a member of a first set of values, if the location contains a certain value, and wherein the second setting means includes means for selecting a pattern, using the first value; and second means for determining whether the second value substantially matches the pattern;

third means for setting the output pixel, in accordance with whether the second value substantially matches the pattern.

10. The system of claim 8, wherein the determining means includes a first memory means;

means for reading a location in the first memory means using the first value;

means for determining that the first value is a member of a first set of values, if the location contains a certain value, and wherein the second setting means includes a second memory means;

means for reading a plurality of locations in the second table using the first value, to produce a plurality of masks; and third means for setting the output pixel, in accordance with the second value and the plurality of masks.

11. The system of claim 10, wherein the plurality of masks include first, second, and third masks each having a digit corresponding to each pixel in the second set of pixels, respectively, and the second setting means includes means for comparing the second value to the first mask to produce a first result;

means for comparing the second value to the second mask to produce a second result;

means for comparing the second value to the third mask to produce a third result; and means for reading a location in a third memory means using the first value to produce an intensity value for the output pixel, depending on the first, second, and third results.

12. The system of claim 10, wherein the plurality of masks include first, second, and third masks each having a digit corresponding to each pixel in the second set of pixels, respectively, and the second setting means includes first means for ANDing the second value with the first mask to produce a first result;

second means for ANDing the second value with the second mask to produce a second result;

third means for ANDing the second value to the third mask to produce a third result;

means for reading a location in a third memory means using the first value to produce an intensity value for the output pixel, if the first and second results are nonzero and the third result is zero.

13. The system of claim 8, wherein the second forming means includes means for forming the second value from intensities of a second set of pixels that are mutually exclusive from the first set of pixels.

14. The system of claim 8, wherein the second forming means includes means for forming the second value from intensities of a second set of pixels that are surrounding the first set of pixels.

* * * * *